United States Patent [19]

Taniguchi

[11] Patent Number: 4,643,518
[45] Date of Patent: Feb. 17, 1987

[54] METALLIC ROTATIONAL POLYGON MIRROR

[75] Inventor: Yasushi Taniguchi, Tokyo, Japan

[73] Assignee: Canon Kabushiki Kaisha, Tokyo, Japan

[21] Appl. No.: 710,061

[22] Filed: Mar. 11, 1985

[30] Foreign Application Priority Data

Mar. 19, 1984 [JP] Japan ................... 59-51224

[51] Int. Cl.$^4$ .............................. G02B 26/10
[52] U.S. Cl. ...................... 350/6.8; 350/1.6
[58] Field of Search ............. 350/1.6, 1.7, 6.5, 6.8, 350/3.71

[56] References Cited

U.S. PATENT DOCUMENTS

| | | | |
|---|---|---|---|
| 3,853,386 | 12/1974 | Ritter et al. | 350/1.6 |
| 4,122,239 | 10/1978 | Riboulet et al. | 350/1.7 |
| 4,189,205 | 2/1980 | Vandehei | 350/1.7 |
| 4,229,066 | 10/1980 | Rancourt et al. | 350/1.6 |
| 4,447,112 | 5/1984 | Matsuoka et al. | 350/6.5 |
| 4,504,109 | 3/1985 | Taga et al. | 350/1.6 |

FOREIGN PATENT DOCUMENTS 4004 1/1982 Japan.

Primary Examiner—John K. Corbin
Assistant Examiner—Loha Ben
Attorney, Agent, or Firm—Fitzpatrick, Cella, Harper & Scinto

[57] ABSTRACT

This specification discloses a metallic rotational polygon mirror having a metallic member formed of aluminum or an alloy thereof, a thin film formed of at least one of chromium, tungsten and nickel on the metallic member, and a thin metal film of high reflection factor formed of at least one of gold, silver and copper on the thin film. The metallic rotational polygon mirror has a high reflection factor and a strong intimate contact property between the metallic member and the thin film and between the thin films, and has excellent corrosion resistance and durability.

7 Claims, 3 Drawing Figures

4,643,518

METALLIC ROTATIONAL POLYGON MIRROR

BACKGROUND OF THE INVENTION

1. Field of the Invention

This invention relates to a rotational polygon mirror used as a reflecting mirror in a copying apparatus, a facsimile apparatus, a laser beam printer or the like, and more particularly to a metallic rotational polygon mirror having a high reflection factor and excellent durability.

2. Description of the Prior Art

Some copying apparatuses, facsimile apparatuses, laser beam printers or the like use a rotational polygon mirror having a reflecting surface of high accuracy. Such a rotational polygon mirror is generally made by diamond-cutting a soft metal blank such as Al or Cu, and it is well known that these metal materials are susceptible to chemical change by the outside atmosphere. For example, Al creates an $Al_2O_3$ layer on the surface thereof by oxidation and reduces its reflection factor. Also, Cu is liable to react chemically and cause oxidation and corrosion. Further, these metals are very soft and therefore are remarkably susceptible to surface damage from mechanical contact, such as wiping the cut mirror surface. Also, where a semiconductor laser of near-infrared light is used as as the light source, the reflection factor of the polygon mirror need be high from the necessity of enhancing the energy of reflected light relative to the high-speed rotation of the rotational polygon mirror. As a countermeasure for these problems, it has heretofore been practised to form on the metallic mirror surface a single-layer or multi-layer film of dielectric material as a protective film or a reflection increasing film by means such as vacuum evaporation. For example, the rotational polygon mirror shown in Japanese Laid-open Patent Application No. 22003/1984 was made by super-precision-working an aluminum alloy to form a reflecting surface, and thereafter providing an aluminum coating film, an $SiO_2$ coating film and a $TiO_2$ coating film in sucession on the reflecting surface, and the protection of the aluminum coating film surface and the increased reflection are accomplished by a thin dielectric material film formed of $SiO_2$ and $TiO_2$.

However, where the reflecting surface is formed of aluminum or an alloy thereof, even if the increased reflection is accomplished by a thin dielectric material film, the reflection factor of the polygon mirror has been limited because the reflection factor of aluminum itself is low. Accordingly, it would occur to mind to provide on an aluminum blank a thin metal film having a higher reflection factor than aluminum to thereby improve the reflection factor, but in this case, corrosion would occur due to the difference in ionization tendency between the aluminum blank and the thin metal film, or a problem would arise in the film strength and the intimate contact property of the thin metal film.

SUMMARY OF THE INVENTION

It is an object of the present invention to solve the above-noted problems and to provide a metallic rotational polygon mirror which has a high reflection factor and in which the intimate contact property between a metallic member and a thin film of high reflection factor is enhanced and which is free of corrosion and excellent in durability.

To achieve the above object, the metallic rotational polygon mirror according to the present invention has a metallic member formed of aluminum or an alloy thereof, a thin film formed of at least one of chromium, tungsten and nickel on the metallic member, and a thin metal film of high reflection factor formed of at least one of gold, silver and copper on the thin film.

By the above-described construction, improvement of the reflection factor and prevention of corrosion are made possible and the intimate contact property of the thin film is made strong enough to withstand high-speed rotation. Also, to further improve the reflection factor, at least two layers, of thin dielectric material film may be formed on the thin metal film of high reflection factor, and this thin dielectric material film not only has the reflection increasing effect but also serves as a protective film.

DESCRIPTION OF THE PREFERRED EMBODIMENT

Figure 1:
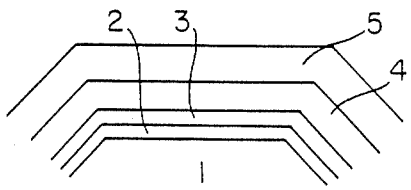
FIG. 1 shows an example of the construction of a metallic rotational polygon mirror according to the present invention.

Aluminum used as a metallic member in the present invention is easy to effect mirror surface working and is inexpensive, and usually by diamond-cutting the outer periphery of the blank a polygonal structure is formed.

As a thin metal film of high reflection factor formed on the aluminum mirror surface, a thin film of gold, silver or copper and the film thickness thereof may preferably be 800 Å or more. The formation of the thin film may be accomplished, for example, by vacuum evaporation. That is, after sufficient chemical washing of the mirror surface cleaning by ion impact such as ion bombardment is effected within a vacuum evaporation apparatus, and further cleaning of the mirror surface is effected, whereafter a thin film is deposited by evaporation on the surface thereof.

Where, as previously described, aluminum is used as the metal material, if a thin film of copper or the like is formed directly on the aluminum mirror surface, corrosion will occur on the surface of the metal due to the difference in ionization tendency between aluminum and copper or the like. Also, the polygon mirror is rotated at a high speed and therefore, it becomes necessary for the thin film provided on the surface of the metallic member to have sufficient intimate contact property and durability to withstand the rotation. Accordingly, it is preferable to further provide a thin film of chromium, tungsten or nickel between the mirror surface of the blank and the thin metal film of high reflection factor with a view to prevent corrosion of the mirror surface of the metal member and improve the intimate contact between the mirror surface and the thin metal film of high reflection factor. The formation of this thin film may preferably be accomplished by the vacuum evaporation method as in the case of the previously described formation of the thin metal film of high reflection factor.

Further, the thin film formed on the thin metal film of high reflection factor is for the purposes of protecting the mirror surface and increasing the reflection, and usually, it forms alternate layers of low refractive index and high refractive index from the reflecting metal film side and preferably, the alternate layers may be two layers or four layers. $M_gF_2$, $SiO_2$, $Al_2O_3$ or the like is preferable as the dielectric material of low refractive index, and $Z_rO_2$, $TiO_2$, $CeO_2$, $SiO$ or the like is preferable as the dielectric material of high refractive index. The reflection increasing effect by the dielectric multilayer film of a metallic reflecting mirror is described in detail in K. C. Park: *Applied Optics*, Vol. 3, No. 7, 1964, etc., and the film thickness of the dielectric material is based on odd number times the optical film thickness, i.e., λ/4 with regard to any of the layers, but specifically, optimization of the film thickness is contrived so that the reflection factor is greatest for a desired wavelength and the angle dependency on the incident light is small. The formation of the dielectric layer thin film is accomplished by the conventional vacuum evaporation method (including the ion plating and the sputtering).

The present invention will hereinafter be described further by reference to the drawings. FIG. 1 is a schematic cross-sectional view showing an example of the construction of the metallic rotational polygon mirror according to the present invention. A blank 1 is aluminum which itself has a high reflection factor, and the surface thereof is mirror-surface-worked by diamond-cutting. This mirror surface was chemically sufficiently washed, whereafter within a vacuum evaporation apparatus, it was cleaned by ion impact such as ion bombardment, and cleaning of the mirror surface was further effected. A thin film 2 of chromium was formed to a thickness of 1000 Å on the mirror surface by the vacuum evaporation method, whereafter a thin film 3 of copper was further formed to a thickness of 1000 Å thereon by a similar method. Then, a thin film 4 of $Al_2O_3$ and a thin film 5 of $TiO_2$ were hard-coated to optical thickness of 176 nm and 207 nm, respectively, in the named order by the vacuum evaporation method, whereby the metallic rotational polygon mirror of the present invention was obtained.

Figure 2:
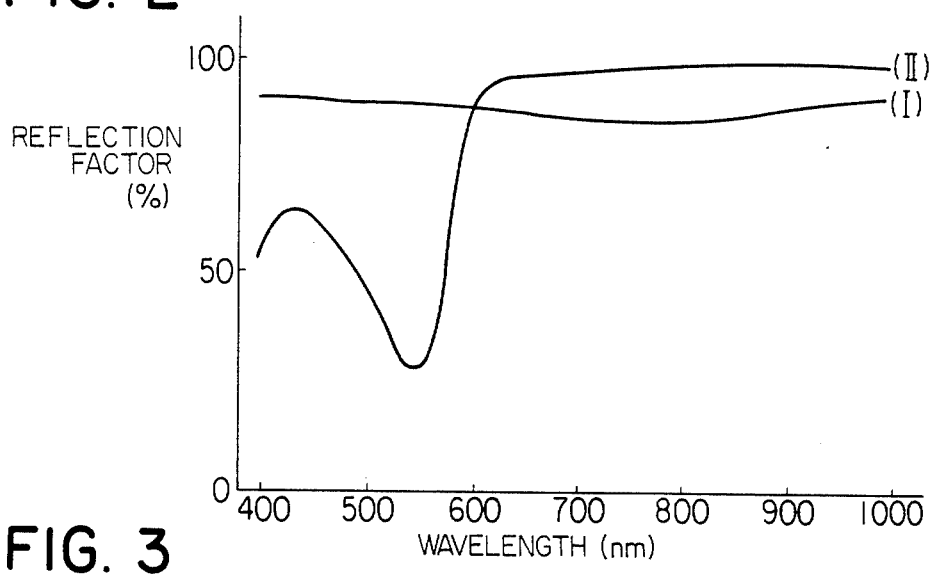
FIG. 2 is a graph showing the mirror surface reflection factors of the example of the construction shown in FIG. 1 and a comparative example, the abscissa of the graph representing the wavelength and the ordinate of the graph representing the reflection factor.
Figure 3:
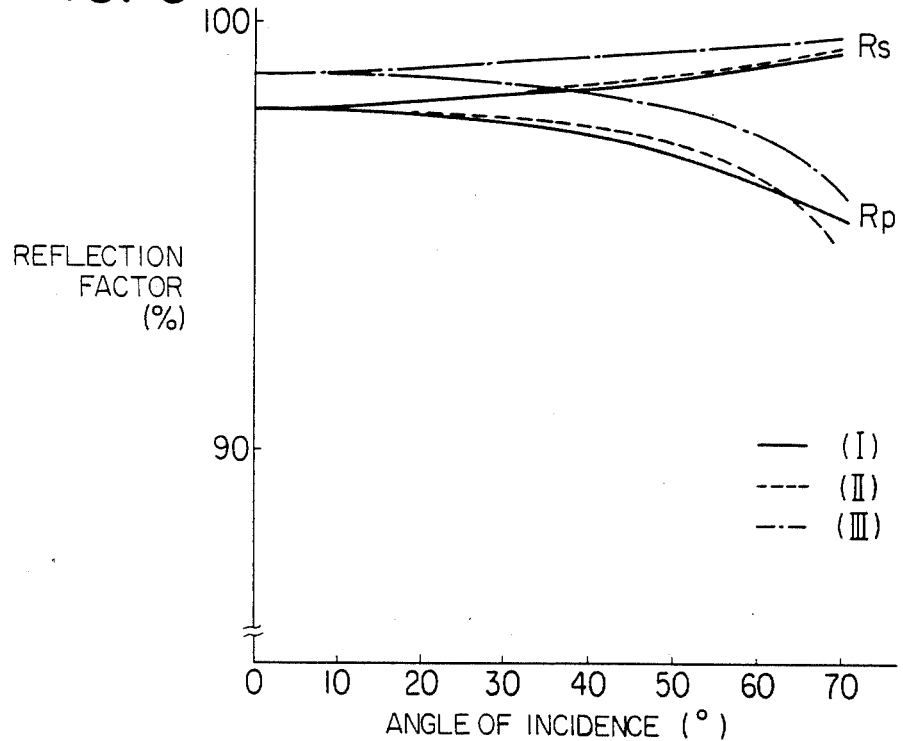
FIG. 3 is a graph showing the incidence angle dependencies of the mirror surface reflection factor of the example of the construction shown in FIG. 1 and a comparative example, the abscissa of the graph representing the angle of incidence and the ordinate of the graph representing the reflection factor.

The reflection factor (II) of the metallic rotational polygon mirror made by the above-described method, with the reflection factor (I) of the mirror surface of an aluminum blank prepared as a comparative example, is shown in FIG. 2. The wavelength of a semiconductor laser usually used is 780–790 nm and in the vicinity of this wavelength range, aluminum exhibits the reduction in reflection factor by abnormal dispersion. However, the mirror of the present invention solves such a problem and has a reflection factor of 95% or more. Also, the rotational polygon mirror is rotated at a high speed during its use and therefore, the angle of incidence of the laser light is varied greatly. The calculation result (III) of the relation between the angle of incidence on the mirror surface of the metallic rotational polygon mirror made by the above-described method and the reflection factor thereof, with the calculation result (I) in the case of a copper mirror surface and the calculation result (II) in a case where only a thin film of SiO is formed on the copper mirror surface, is shown in FIG. 3. In FIG. 3, Rs represents the S component of the reflection factor and Rp represents the P component of the reflection factor. It is apparent from FIG. 3 that in the present invention, the reflection factor and the angle dependency of the incident light are improved.

Next, with regard to durability, the surface of the rotational polygon mirror according to the present invention was cleaning-tested by using acetone, isopropyl alcohol and methanol as a solvent resistance test, and no change was found in the reflection factor and appearance thereof and it was confirmed that the rotational polygon mirror of the present invention has a sufficient solvent resistance. Also, the intimate contact property test by Scotch tape and the abrasion test by cotton cloth (cheese cloth) were carried out and as a result of these tests, changes in appearance such as peel-off and crack and a change in reflection factor were not found. With regard to moisture resistance, even after the rotational polygon mirror of the present invention was placed in a constant-temperature constant-humidity tank of 45° C. and relative humidity 95% for 1000 hours or longer, no reduction in reflection was found and any chemical change such as corrosion did not occur. Further, damage by a semiconductor laser was not found.

As described above, the rotational polygon mirror of the present invention optically has a high reflection factor for a desired wavelength and also has an excellent optical characteristic that the incidence angle dependency of the incident light is small. Further, there is no corrosion of the blank mirror surface and the rotational polygon mirror of the present invention is excellent in chemical stability such as solvent resistance and moisture resistance and physical stability such as intimate contact property and wear resistance and thus, it is a highly practical metallic rotational polygon mirror.

What I claim is:

1. A metallic rotational polygon mirror comprising a metallic member formed of aluminum or an alloy thereof, a first thin film disposed on said metallic member and being formed of at least one of chromium, tungsten and nickel, a metallic second thin film, of high reflection factor, disposed on said first thin film and being formed of at least one of gold, silver and copper, and a thin film having at least two layers of dielectric material disposed on said metallic second thin film.

2. A metallic rotational polygon mirror according to claim 1, wherein said dielectric thin film has, in successive order from said metallic second thin film, two or four alternate layers of dielectric material of low refractive index and high refractive index.

3. A metallic rotational polygon mirror according to claim 1, wherein the film thickness of said metallic second thin film is 800 Å or greater.

4. A metallic rotational polygon mirror according to claim 1, wherein the film thickness of said dielectric thin film is an odd multiple of a quarter of the wavelength of the incident light.

5. A metallic rotational polygon mirror according to claim 1, wherein said first thin film and said metallic second thin film are each formed by a vacuum evaporation method.

6. A metallic rotational polygon mirror according to claim 1, wherein said dielectric thin film is formed by a vacuum evaporation method.

7. A metallic rotational polygon mirror comprising a metallic member formed of aluminum or an alloy thereof, a first thin film disposed on said metallic member and being formed of chromium, a metallic second thin film, of high reflection factor, disposed on said first thin film and being formed of copper, and a thin film of dielectric material being provided on said metallic second thin film, said thin dielectric material film comprising, in successive order from said metallic second thin film, two or four alternate layers of $Al_2O_3$ and $TiO_2$.

* * * * *